United States Patent
Polehn

(10) Patent No.: US 9,466,028 B2
(45) Date of Patent: Oct. 11, 2016

(54) RULE-BASED NETWORK DIAGNOSTICS TOOL

(71) Applicant: Cellco Partnership, Arlington, VA (US)

(72) Inventor: Donna L. Polehn, Kirkland, WA (US)

(73) Assignee: Cellco Partnership, Basking Ridge, NJ (US)

( * ) Notice: Subject to any disclaimer, the term of this patent is extended or adjusted under 35 U.S.C. 154(b) by 256 days.

(21) Appl. No.: 14/173,739

(22) Filed: Feb. 5, 2014

(65) Prior Publication Data

US 2015/0220837 A1    Aug. 6, 2015

(51) Int. Cl.
*G06N 5/04*    (2006.01)
(52) U.S. Cl.
CPC ...................... *G06N 5/047* (2013.01)
(58) Field of Classification Search
CPC ....................................................... G06N 5/02
See application file for complete search history.

(56) References Cited

U.S. PATENT DOCUMENTS

2011/0231704 A1\* 9/2011 Ge ................. G06F 11/0709
714/26
2012/0317269 A1\* 12/2012 Weppler ............ H04L 41/0654
709/224

\* cited by examiner

*Primary Examiner* — Stanley K Hill
*Assistant Examiner* — Ola Olude Afolabi

(57) ABSTRACT

A system may be configured to receive performance information regarding a set of network devices; compare the performance information to a set of rule objects; and detect an occurrence of a particular network event. The detecting may include determining that the performance information, associated with a particular network device, of the set of network devices, meets the set of conditions associated with a particular rule object with which the particular network event is associated. The system may further present information regarding the particular rule object, such as information regarding the particular network event, and information regarding a recommendation regarding the particular network event.

20 Claims, 12 Drawing Sheets

500 →

| Object name | Conclusion | Recommendation | Rule(s) |
|---|---|---|---|
| Router down | The router is down or the interface is down. | Check the router interface. Try reseating the interface card and restarting. | Availability = 0% AND frame loss = 100% AND op state = down |
| EBH circuit down | The leased EBH circuit is down. | Place a trouble ticket with the carrier. | Availability = 0% AND Op state = down AND leased circuit = YES |
| Cell router config problem | There is a problem with the call router configuration. | Reinstall the interface. If that does not work, place a trouble ticket with the vendor. | Availability = 0% and Op state = Up AND FullDuplex = YES |
| EBH circuit needs uplift | The EBH circcuit needs a BW augmentation. | Contact the transport engineering group and request that the EBH circuit be uplifted. | Availability > 95% AND Frame loss > .001% AND Grooves > 9 AND Utilization > 60% |
| Router egress rate setting wrong | The 7705 egress rate is set incorrectly. | Check/change the router egress rate. It should match the rate of the EBH circuit from the provider. | Availability > 95% AND Frame loss > .001% AND Grooves > 9 AND Utilization < 60% AND Egress rate != config. rate |

FIG. 5

RULE-BASED NETWORK DIAGNOSTICS TOOL

BACKGROUND

Networks, such as wireless telecommunications networks, allow communication between user devices (such as cellular telephones) and other devices (such as servers, other user devices, etc.). Service providers, such as cellular telephone service providers, may utilize proprietary networks, as well as networks provided by other vendors (e.g., an Ethernet Backhaul Network ("EBH"), leased from a vendor of the EBH). Since different networks may be provided by different vendors, a service provider may not be able to easily identify issues with individual portions of the service provider's proprietary network as well as with portions of networks leased from other vendors.

BRIEF DESCRIPTION OF THE DRAWINGS

FIG. 5 illustrates example data structure that may reflect a specification of a set of rule objects;

DETAILED DESCRIPTION OF PREFERRED EMBODIMENTS

The following detailed description refers to the accompanying drawings. The same reference numbers in different drawings may identify the same or similar elements.

Techniques described herein may provide a network analysis tool, which may allow for the analysis of components (e.g., routers, switches, and/or other components) of one or more networks, including networks not owned or administered by an operator of the network analysis tool. The network analysis tool may use various types of data in order to provide analysis information regarding components of one or more networks.

Figure 1:
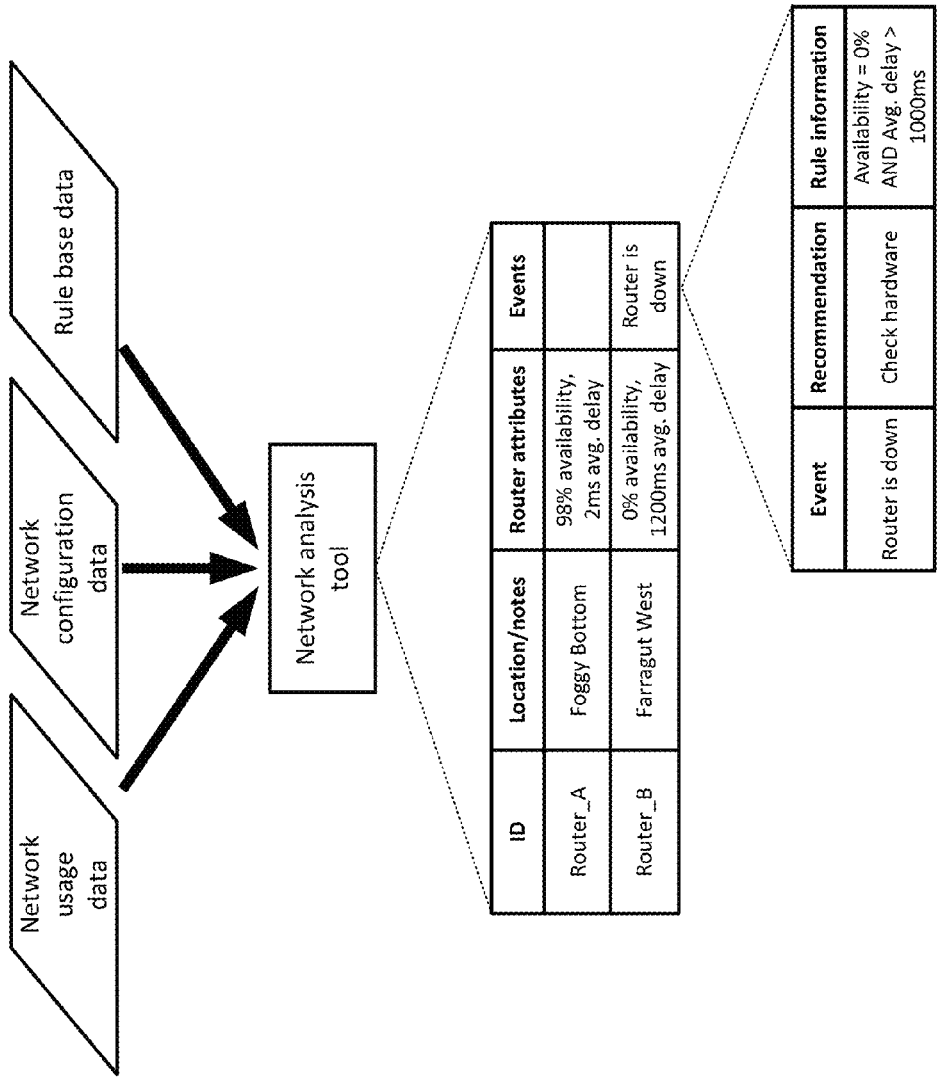
FIG. 1 illustrates an overview of one or more example implementations described herein.

For instance, as shown in FIG. 1, a network analysis tool may receive network usage data, network configuration data, and rule base data. The network usage data may include real-time performance and/or usage information, such as round-trip delay, latency, throughput, jitter, and/or other types of information. The network usage data may be granular to the extent that information regarding individual network nodes (e.g., information regarding individual routers, switches, etc.) is received, and/or may include information regarding network segments (e.g., latency, throughput, etc. associated with a network segment that includes two or more network nodes). The network usage data may be received from the network nodes themselves, and/or from another device that collects and/or aggregates network usage information.

The network configuration data may include information relating to the configuration of network nodes and/or network segments. For example, the network configuration data may include port ingress and egress rates of one or more routers, laser light levels of optical circuits, duplex settings, quality of service ("QoS") policies, or the like.

The rule base data may include rule objects that may define events that may be of interest to a user of the network analysis tool. For example, a particular rule object may include a set of rules (e.g., conditions relating to the network usage data and/or the network configuration data) associated with a particular event (e.g., a detrimental network condition, such as an outage). The rule object may also include other information associated with the event, such as a recommendation as to how to handle the event.

As further shown in FIG. 1, based on the network usage data, the network configuration data, and/or the rule base data, the network analysis tool may generate a report regarding a set of network components. For example, as shown, the report may include identifiers associated with a set of routers ("Router ID"), a location or other notes regarding the routers, attributes of the routers (e.g., based on usage data associated with the routers), and event notifications. In the example shown, the router having the identifier "Router_B" may be associated with the event, "Router is down." The network analysis tool may have made the determination that the "Router is down" event occurred, based on one or more rule objects in the rule base data.

As also shown, the network analysis tool may allow the user to view more detailed information about the event. For example, the network analysis tool may present the name or summary of the event ("Event"), a recommendation associated with the event, and information identifying rules associated with the event (e.g., one or more conditions that, if true, indicate that the event has occurred).

By providing a rule-based presentation of events and statistics in a network, the network analysis tool may provide an enhanced amount of information to a user of the network. Further, presenting events in a rule-based fashion, based on usage data and/or configuration data, may allow a user to customize the types of events that should be presented.

As described further below, the network analysis tool may also allow the user to create new rule objects, based on presently occurring attributes. Allowing this type of rule object creation may streamline the rule object creation process for a user. As also described below, the network analysis tool may include an adaptive implementation that identifies commonly occurring sets of attributes that are not presently associated with a rule object, and may create a rule object based on the attributes and/or notify a user regarding the commonly occurring sets of attributes. In this sense, the network analysis tool may "learn" common attributes that may occur in a network, which may allow a user to quickly identify events that may not necessarily have been readily identifiable.

Figure 2:
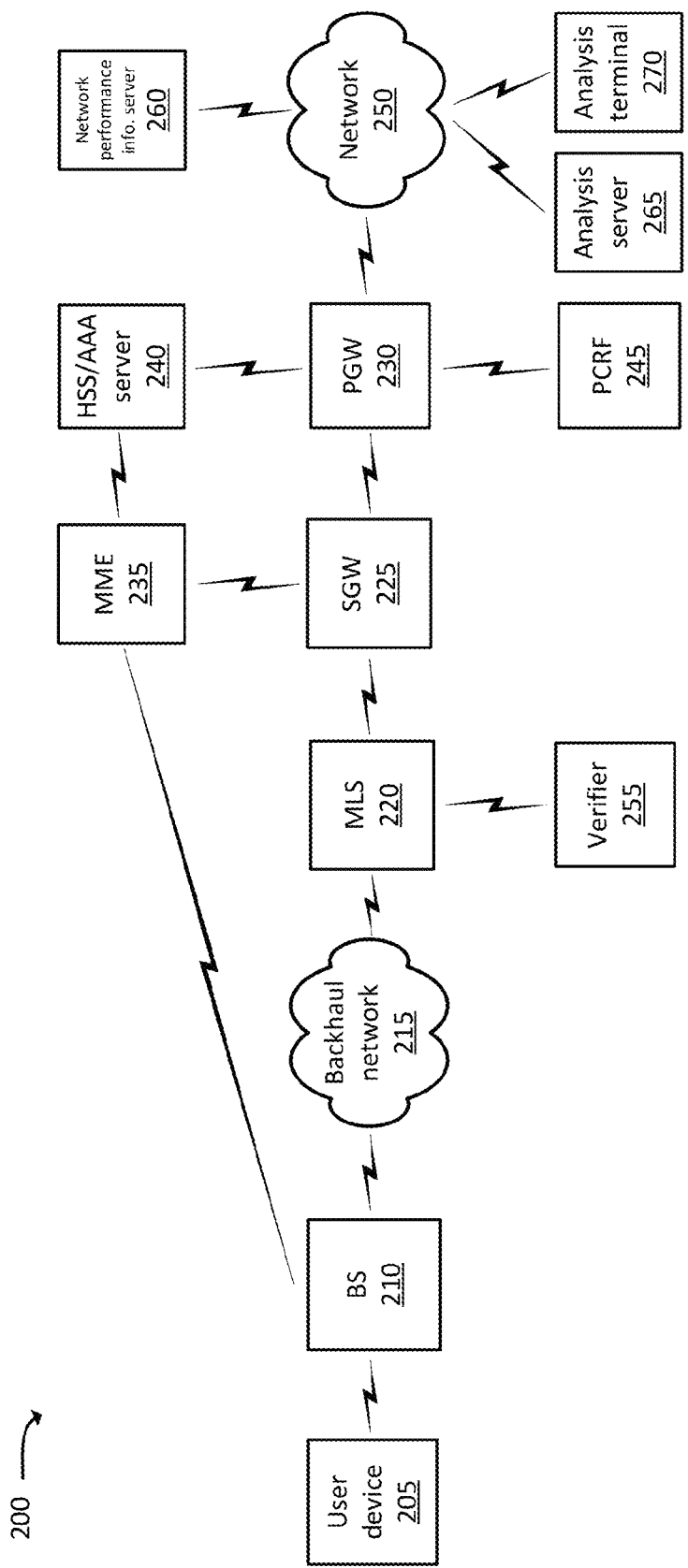
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205, base station ("BS") 210 (which may, in some implementations, take the form of an evolved node B ("eNB")), backhaul network 215, multi-layer switch ("MLS") 220, SGW 225, packet data network ("PDN") gateway ("PGW") 230, mobility management entity device ("MME") 235, home subscriber server ("HSS")/authentication, authorization, accounting ("AAA") server 240 (hereinafter referred to as "HSS/AAA server 240"), policy charging and rules function ("PCRF") 245, network 250, verifier 255, network performance information server 260, analysis server 265, and analysis terminal 270.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an eNB, via which user device 205 may communicate with the EPC network. The EPC network may include one or more SGWs 225, PGWs 230, and/or MMEs 235, and may enable user device 205 to communicate with network 250 and/or an Internet protocol ("IP") multimedia subsystem ("IMS") core network. The IMS core network may include HSS/AAA server 240, and may manage authentication, session initiation, account information, a user profile, etc., associated with user device 205.

User device 205 may include any computation and communication device, such as a wireless mobile communication device that is capable of communicating with base station 210 and/or network 250. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from network 250 via base station 210, backhaul network 215, MLS 220, SGW 225, and/or PGW 230.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Additionally, or alternatively, one or more other base stations 210 may be associated with a RAN that is not associated with the LTE network (e.g., a wireless hot spot, a wireless access point, etc.). Base station 210 may receive traffic from and/or send traffic to network 250 via SGW 225 and PGW 230. Base station 210 may send traffic to and/or receive traffic from user device 205 via, for example, an air interface.

Backhaul network 215 may include one or more networking devices (e.g., routers and/or switches) and links (e.g., fiber or coaxial links), that connect respective base station 210 to a core network (e.g., a core network that includes MLS 220, SGW 225, and/or PGW 230). In some implementations, access to backhaul network 215 may be provided by a particular service provider, to a different service provider, who is associated with SGW 225, PGW 230, and/or network 250. Access to backhaul network 215 may be provided with QoS guarantees, such as a minimum guaranteed throughput, a maximum guaranteed latency, a minimum guaranteed reliability, and/or other QoS guarantees.

MLS 220 may include one or more network devices that perform switching functionality on traffic received from SGW 225 and/or backhaul network 215. MLS 220 may operate multiple layers of the Open Systems Interconnection ("OSI") reference model, in contrast with other switches that traditionally operate only on the Data Link Layer ("DLL"). For example, MLS 220 may perform deep packet inspection to perform routing functions.

SGW 225 may include one or more network devices that gather, process, search, store, and/or provide information in a manner described herein. SGW 225 may, for example, aggregate traffic received from one or more base stations 210 and may send the aggregated traffic to network 250 via PGW 230.

PGW 230 may include one or more network devices that gather, process, search, store, and/or provide information in a manner described herein. PGW 230 may aggregate traffic received from one or more SGWs 225, etc. and may send the aggregated traffic to network 250. PGW 230 may also, or alternatively, receive traffic from network 250 and may send the traffic toward user device 205 via SGW 225 and/or base station 210.

MME 235 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 235 may perform policing operations on traffic destined for and/or received from user device 205.

HSS/AAA server 240 may include one or more server devices that manage, update, and/or store, in a memory associated with HSS/AAA server 240, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 205 and/or one or more other user devices 205. Additionally, or alternatively, HSS/AAA server 240 may perform authentication, authorization, and/or accounting operations associated with the subscriber and/or a communication session with user device 205.

PCRF 245 may include one or more server devices that aggregate information to and from the EPC network and/or other sources. PCRF 245 may receive information regarding policies and/or subscriptions from one or more sources, such as subscriber databases and/or from one or more users (such as, for example, an administrator associated with PCRF 245).

Network 250 may include one or more wired and/or wireless networks. For example, network 250 may include a packet data network ("PDN"), such as an IP-based PDN. Network 250 may include, for example, a wide area network such as the Internet, or one or more other networks. User device 205 may connect, through PGW 230, to data servers, application servers, or to other servers/applications that are coupled to network 250.

Verifier 255 may include one or more devices that collect information regarding network nodes in environment 200. For example, verifier 255 may inject packets into MLS 220 and/or backhaul network 215, and may determine attributes associated with MLS 220 and/or portions of backhaul network 215 (e.g., routers, switches, or other devices within backhaul network 215) based on responses to the packets. For instance, verifier 255 may determine a frame loss rate, a frame delay (also sometimes referred to as "round trip delay"), frame delay variation (also sometimes referred to as "jitter"), availability (also sometimes referred to as "uptime"), and/or other attributes. In some implementations, environment 200 may include more than one verifier 255. While verifier 255 is shown in FIG. 2 as being in communication with MLS 220, in some implementations, one or more verifiers 255 may be in direct or indirect communication with one or more other devices, such as a device within backhaul network 215, SGW 225, PGW 230, and/or one or more other devices.

Network performance information server 260 may include one or more server devices that receive and/or store performance information regarding backhaul network 215, MLS 220, and/or one or more other network nodes (e.g., routers, switches, and/or other devices) or segments (portions of a network that include two or more network nodes). Network performance information server 260 may receive performance information from individual network nodes, and/or from another source (e.g., from verifier 255, and/or another device that collects performance information regarding backhaul network 215 and/or MLS 220).

Analysis server 265 may include one or more server devices that aggregate and analyze network performance information (e.g., information provided by network performance information server 260), and present an analysis to a user (e.g., output the analysis to analysis terminal 270). In some implementations, analysis server 265 may perform the analysis in a rule-based manner, as described in greater detail below.

Analysis terminal 270 may include one or more client devices that receive information from analysis server 265, and present the information to, for example, a user of analysis terminal 270. Analysis terminal 270 may include a particular user device 205, and/or may include another type of device, such as a desktop computer.

Figure 3:
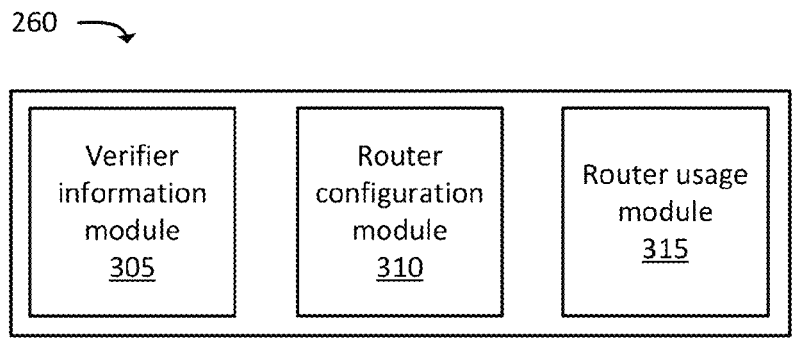
FIG. 3 illustrates example functional components of a network performance information server, in accordance with one or more implementations.

FIG. 3 illustrates example functional components of network performance information server 260. As shown, network performance information server 260 may include verifier information module 305, router configuration module 310, and router usage module 315. In other implementations, network performance information server 260 may include additional, fewer, different, or differently arranged components. In some implementations, the functionality described below with regard to one component may be performed in whole or in part by one or more other components.

Verifier information module 305 may store information received from verifier 255. For example, the verifier information may include information determined based on sending packets to network nodes and receiving responses to the packets. As mentioned above, the verifier data may include for example, frame loss, frame delay, frame delay variation, network node availability, and/or other information.

Router configuration module 310 may store information regarding the configuration of one or more network nodes. For example, router configuration module 310 may store information regarding the port ingress rates and egress rates of a set of routers, optimal laser light levels of one or more optical fibers, duplex settings of a set of routers (e.g., half duplex or full duplex), QoS policies associated with a set of network nodes and/or segments, whether a particular node or segment is leased, and/or other configuration information. As described below, the configuration information may be used in the rule-based analysis of network nodes and/or segments. For instance, some of the configuration information may be include threshold values which, if not met, may indicate the occurrence of an event (e.g., an outage, a node not performing satisfactorily, etc.). The configuration information may be received from individual network nodes, from an administrator associated with backhaul network 215 and/or MLS 220, and/or from another source.

Router usage module 315 may store real-world usage information associated with backhaul network 215, MLS 220, and/or one or more other network nodes or segments. The usage information may include, for example, packet statistics (e.g., packets received and/or sent by a particular router, packets discarded by a particular router, etc.), utilization (e.g., an average proportion of available resources, associated with the router, that were utilized over a given period of time), an operational state (e.g., whether a router is "up" or "down"), availability, and/or other usage information. The usage information may be received from individual networks nodes and/or from another source (e.g., a device that collects and aggregates usage information).

Figure 4:
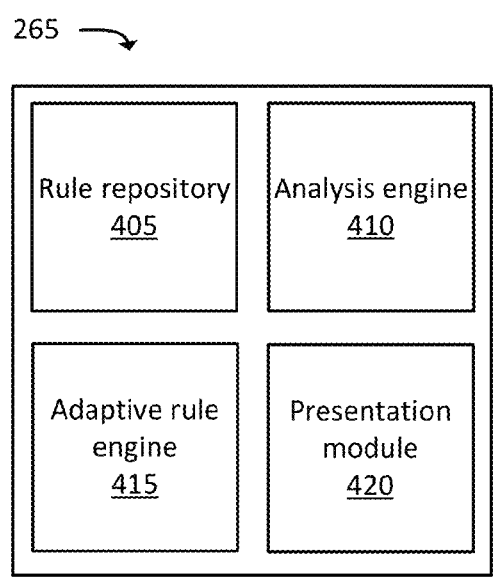
FIG. 4 illustrates example functional components of an analysis server, in accordance with one or more implementations.

FIG. 4 illustrates example functional components of analysis server 265. As shown, analysis server 265 may include rule repository 405, analysis engine 410, adaptive rule engine 415, and/or presentation module 420. In other implementations, analysis server 265 may include additional, fewer, different, or differently arranged components. In some implementations, the functionality described below with regard to one component may be performed in whole or in part by one or more other components.

Rule repository 405 may store a set of rule objects, which may be used by analysis engine 410 to detect the occurrence of events. FIG. 5 illustrates an example data structure 500, which may be stored by rule repository 405. In some implementations, data structure 500 may include information regarding a set of rule objects. For example, as shown, for a particular rule object, data structure 500 may store a name of the object, a conclusion, a recommendation, and a set of rules. The information stored in data structure 500 may be received from a user (e.g., a user of analysis terminal 270), and/or some of the information stored in data structure 500 may be automatically generated by adaptive rule engine 415, as described below.

One example rule object shown in FIG. 5 may have the name, "Router down." The "Conclusion" field may include further or more descriptive information to be presented to a user regarding a detected event, such as "The router is down or the interface is down." The "Recommendation" field may provide a recommendation as to how to remedy the event, such as "Check the router interface. Try reseating the interface card and restarting." The "Rule(s)" field may include one or more conditions that, if true, indicate that the event has occurred. The rules may relate to, for example, verifier information (e.g., information received from verifier information module 305), configuration information (e.g., information received from router configuration module 310), and/or usage information (e.g., information received from router usage module 315). For example, as shown in FIG. 5, the "Router down" rule object may be associated with the rules, "Availability=0% AND frame loss=100% AND op state=down." Thus, as applied to a particular router, a "Router down" event may occur for the particular router when the availability for the router is 0%, when frame loss is 100%, and when an operational state of the router is "down."

In some implementations, a set of rules, associated with a particular rule object, may include one or more rule objects. For example, assume that a first rule object ("Object_A") includes the following conjunction of rules: "Rule_1 AND Rule_2." Further assume that a second rule object ("Object_B") includes the following conjunction of rules: "Object_A AND Rule_3." The rule definition of Object_B may thus be expanded to "(Rule_1 AND Rule_2) AND Rule_3." That is, in the rule definition for Object_B, "Object_A" may be replaced by the rule definition for Object_A. Therefore, an event associated with Object_B may be deemed to occur when conditions specified by Rule_1, Rule_2, and Rule_3 are true.

In some implementations, a set of rules may be specified in terms of trends or relationships. In some implementations, such trends or relationships may be viewed or specified in a graphical manner. For instance, a particular rule may be based on "peaks," "valleys," or other features or derivations of a graph (e.g., plateaus, slopes, curves, best fine lines, etc.) of a particular network performance attribute (e.g., spikes in frame delay, jitter, or other network performance attributes). As another example, a particular rule may be based on how features or derivations of a graph of one network performance attribute relate to features or derivations of a graph of another network performance attribute. For example, a particular rule may specify that an event has occurred when a peak has occurred in a frame delay graph, while a valley has occurred in an availability graph.

As another example, a rule may be based on how features or derivations of a graph of a particular network performance attribute compare to a reference graph. For example, assume that a reference graph is associated with the attribute, "lossy." A network node, for which a frame delay graph matches the reference graph (e.g., based on a pattern matching analysis), may be associated with the "lossy" attribute." Thus, a rule that specifies "Lossy=TRUE" may be true for the network node.

As mentioned above, in some implementations, a rule may be specified based on configuration data. For example, as shown in example data structure 500, the rule set for the object "Router egress rate setting is wrong" may include the rule "Egress rate !=config. rate." This rule may be true when an actual egress rate of a particular router does not match the rate specified in the configuration for the router.

Returning to FIG. 4, analysis engine 410 may receive information from verifier information module 305, router configuration module 310, router usage module 315, and rule repository 405, and may detect the occurrence of events. For example, using rules associated with rule objects, as received from rule repository 405, analysis engine 410 may analyze network performance and configuration information received from verifier information module 305, router configuration module 310, and router usage module 315 to detect the occurrence of events.

Figure 6:
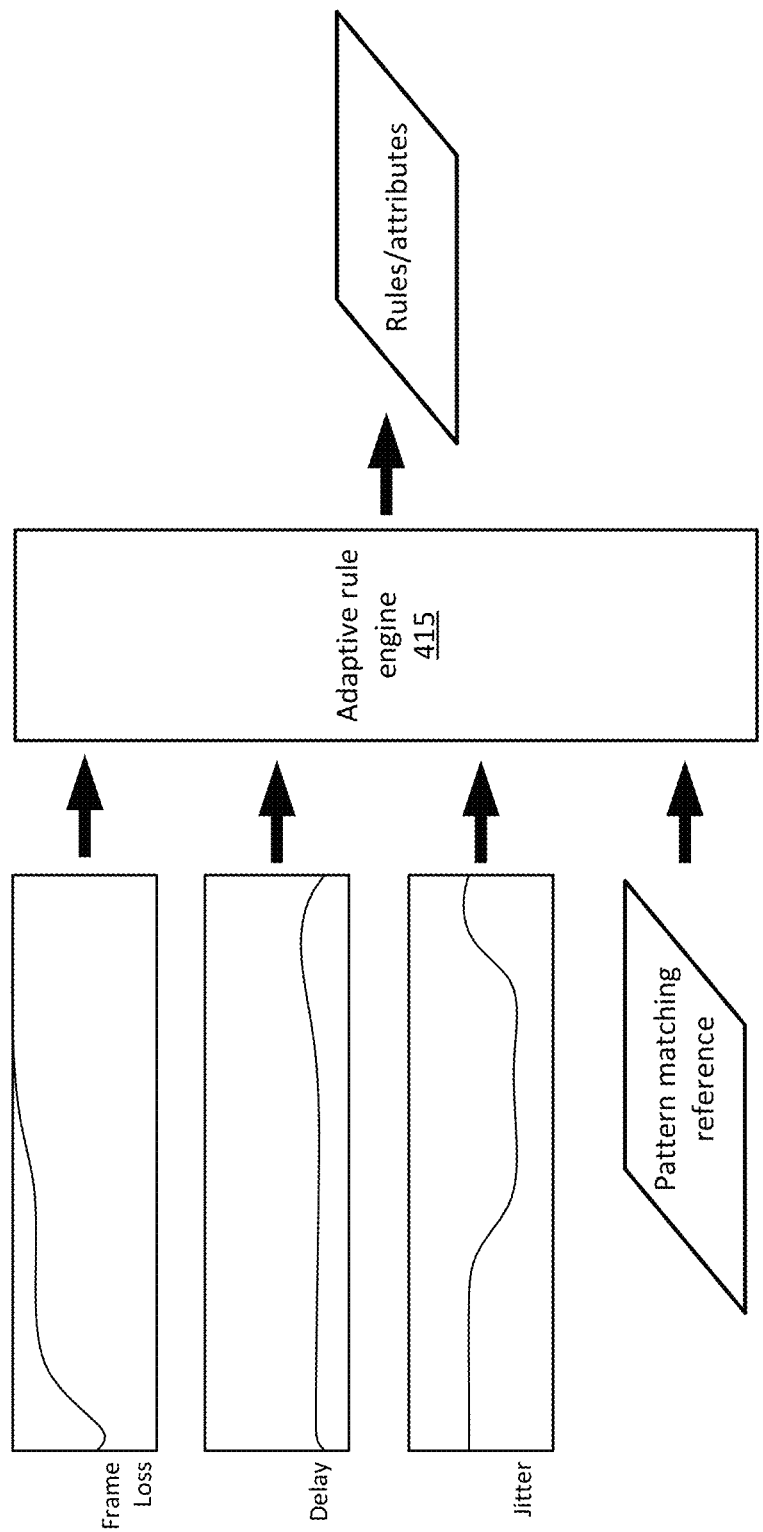
FIG. 6 conceptually illustrates example functionality of an adaptive rule engine, in accordance with one or more implementations.

Adaptive rule engine 415 may perform various functions that serve to iteratively improve the operation of analysis engine 410. For example, as shown in FIG. 6, adaptive rule engine 415 may receive data relating to performance attributes of a network node or segment over time (e.g., frame loss, delay, and jitter). The data may be analyzed by adaptive rule engine 415 in a graphical manner. For example, adaptive rule engine 415 may perform a pattern matching analysis (e.g., using Learned Vector Quantization ("LVQ")) to compare features of the graphs of one or more of these attributes to each other and/or to a reference set of features ("pattern matching reference"). Adaptive rule engine 415 may, for example, identify that features in the graphs of one or more of the attribute match features in the pattern matching reference set. Based on identifying the matching features, adaptive rule engine 415 may derive one or more attributes. As another example, adaptive rule engine 415 may compare performance attribute data to a reference set without generating and/or comparing graphs.

For example, if features of the frame loss graph match particular features in the pattern matching reference set, a corresponding attribute, such as "lossy," may be derived. The "lossy" attribute may apply to network performance data, received from other nodes, based on how closely features of the frame loss graphs of the other nodes match the corresponding data in the pattern matching reference set. The "lossy" attribute may also be used in rule objects. For example, a particular rule object may include the rule, "Lossy=TRUE," which may be true for a particular network node when a graph of the frame loss of the network node matches the reference data for the "lossy" attribute. Adaptive rule engine 415 may, in some implementations, provide the automatically generated attributes to rule repository 405. In some implementations, when determining whether a particular set of network performance data (e.g., frame loss data) matches a particular attribute (e.g., "lossy"), analysis engine 410 may perform a pattern matching (e.g., LVQ pattern matching) technique.

In some implementations, adaptive rule engine 415 may also, or alternatively, identify commonly occurring trends in attributes, which are not associated with any rules or rule objects. For example, adaptive rule engine 415 may store and/or record network performance data over time (or data derived from the network performance information, such as summaries of the data and/or candidate data that may be particularly relevant to trends), and may identify trends in the network performance data. For instance, assume that adaptive rule engine 415 identifies that the set of attributes {Frame loss=40-50%, Frame delay=200-250 ms, Availability<99%} commonly occurs (e.g., at least a threshold proportion of the performance data includes the set of attributes). Further assume that adaptive rule engine 415 identifies that this attribute set is not presently associated with any rule objects (e.g., as stored by rule repository 405). Adaptive rule engine 415 may automatically generate a rule object based on the attribute set (e.g., a rule object with a blank or placeholder name, conclusion, and recommendation), having the rule definition "Frame loss>40% AND Frame loss<50% AND Frame delay>200 ms AND Frame delay<250 ms AND Availability<99%." Adaptive rule engine 415 may also output a notification (e.g., to a user of analysis server 265) that the rule object has been automatically generated, thus giving the opportunity to the user to modify (e.g., change the name, conclusion, recommendation, or rule set) and/or delete the automatically generated rule object. Adaptive rule engine 415 may, in some implementations, provide the automatically generated rule objects to rule repository 405.

Figure 7A:
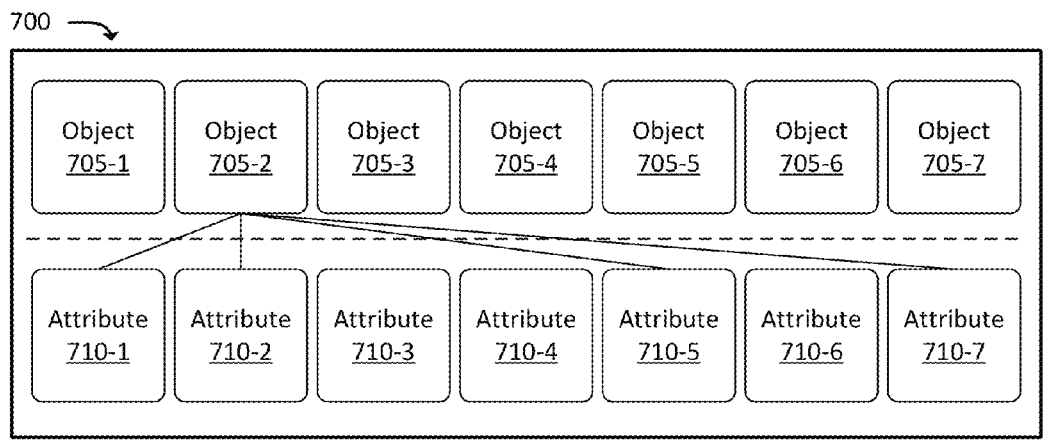
FIGS. 7A-7C illustrate example user interfaces for viewing relationships between rule objects and corresponding attributes.
Figure 7B:
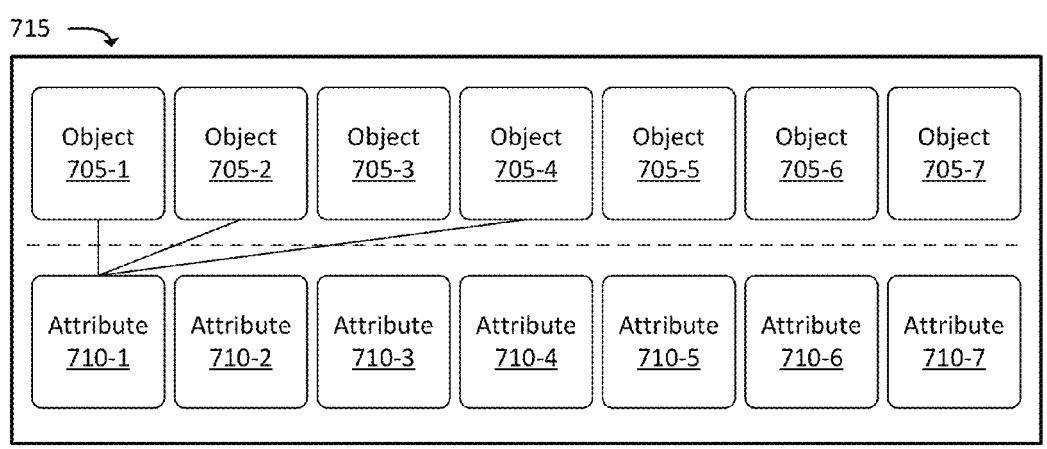
Figure 7C:
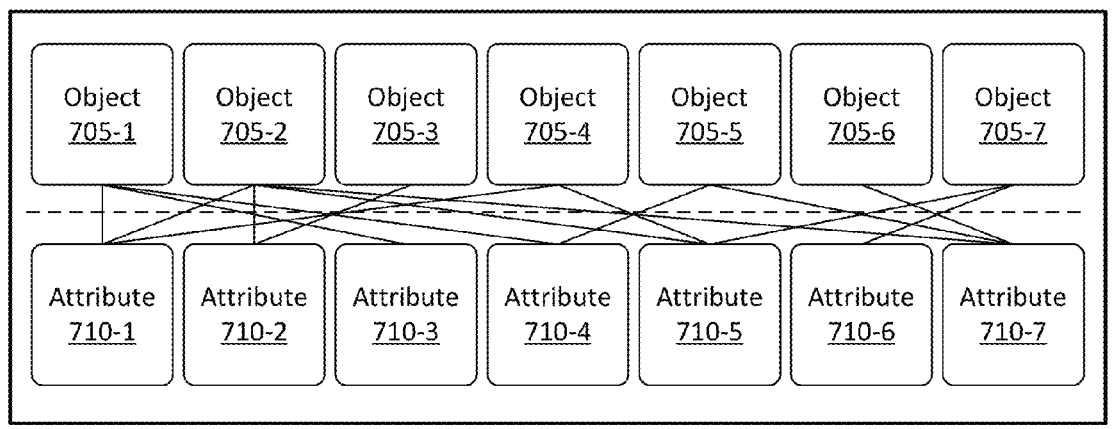

Returning to FIG. 4, presentation module 420 may generate one or more user interfaces to present analysis data (e.g., information regarding detected events and/or information regarding attributes of network nodes). Presentation module 420 may also generate one or more user interfaces that display and/or allow for the manipulation of rule objects. For example, FIGS. 7A-7C illustrate example user interfaces 700, 715, and 720, respectively, which may be used to display and/or allow for the manipulation of rule objects. As shown in FIG. 7A, a set of rule objects 705-1 through 705-7 (sometimes referred to herein individually as "rule object 705," or collectively as "rule objects 705") may be visually represented, and a set of attributes 710-1 through 710-7 (sometimes referred to herein individually as "attribute 710," or collectively as "attributes 710") may be visually represented. A particular attribute may include a particular rule, or, in some implementations, the result of a rule. In some implementations, a particular attribute may be, or may include, a rule object. For example, a particular attribute may include the rule "Frame loss=100%." As another example, an attribute may include the rule "Lossy=TRUE," or may simply include the attribute "Lossy."

In user interface 700, the relationship between rule object 705-2 and its component attributes 710-1, 710-2, 710-5, and 710-7 may be shown. This relationship may indicate that a rule set, associated with rule object 705-2, includes attributes 710-1, 710-2, 710-5, and 710-7. For example, assume that a rule set associated with rule object 705-2 includes the rules "Frame loss=100% AND Op state=DOWN AND Frame delay>1200 ms AND Availability=DOWN." Attributes 710-1, 710-2, 710-5, and 710-7 may each correspond to a particular component of the rule set of rule object 705-2. For example, attribute 710-1 may include the rule "Frame loss=100%," attribute 710-2 may include the rule "Op state=DOWN," attribute 710-5 may include the rule "Frame delay>1200 ms," and attribute 710-7 may include the rule "Availability=DOWN." The attributes may be defined by a user, and/or may be automatically generated (e.g., as described above with respect to FIG. 6).

As shown in FIG. 7B, user interface 715 may display which rule objects 705 are associated with (e.g., include) a particular attribute 710. For instance, as shown, rule objects 705-1, 705-2, and 705-4 may each include attribute 710-1. For example, rule sets associated with each of rule objects 705-1, 705-2, and 705-4 may include attribute 710-1. FIG. 7C illustrates another example user interface 720, which may show which attributes 710 that are included in each rule object 705.

Figure 8:
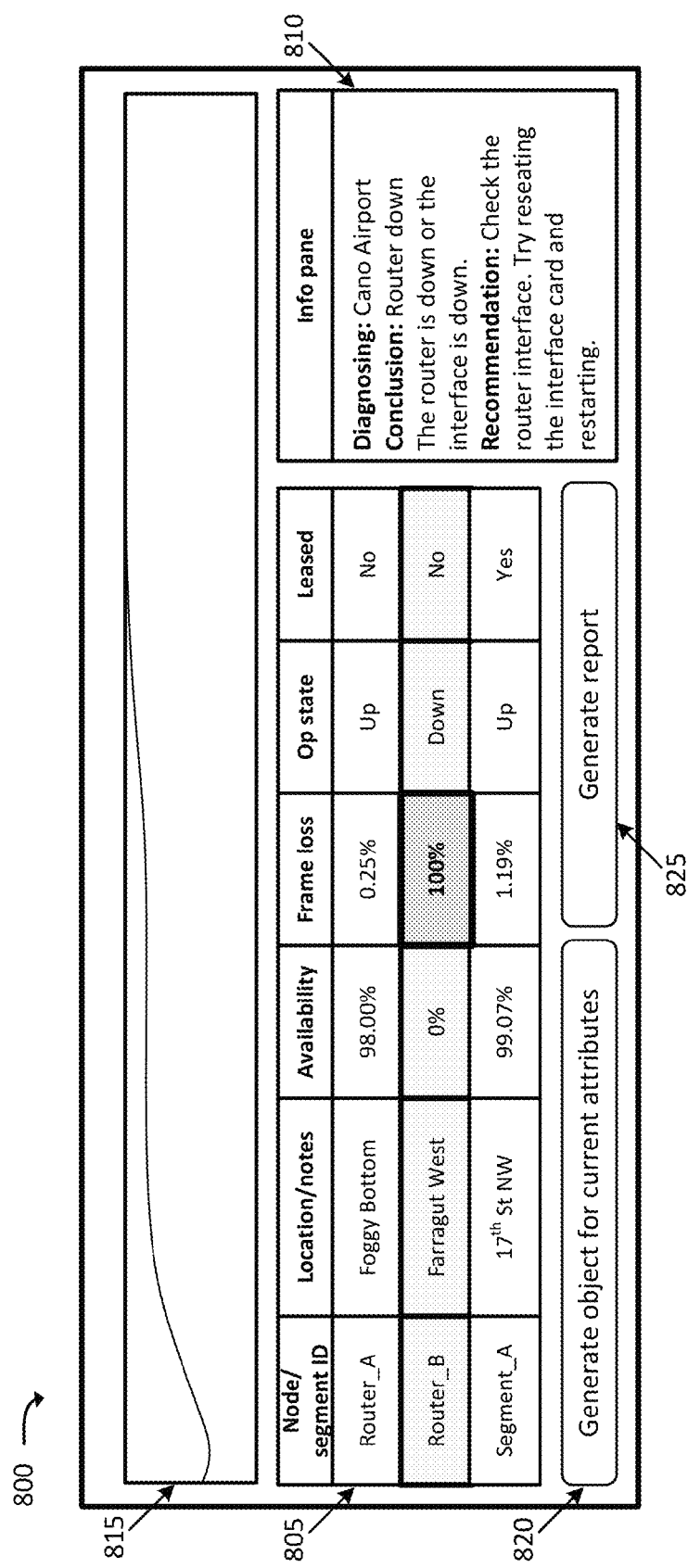
FIG. 8 illustrates an example user interface for viewing network diagnostic information.

FIG. 8 illustrates another user interface 800, which may be presented by presentation module 420. User interface 800 may include display areas 805-820 and selectable options 820 and 825. In this example, display areas 805-820 may be presented in conjunction with one another (e.g., displayed simultaneously). In other implementations, user interface 800 may include additional, fewer, different, or differently arranged display areas.

Display area 805 may include, for example, a table that includes information regarding a set of network nodes (e.g., routers) or segments, as well as performance and/or configuration information associated with the network nodes or segments. For example, display area 805 may display an identifier of a network node or segment ("Node/segment ID"), a location of the node and/or other notes ("Location/notes"), Frame loss, operational state, whether the node or segment is leased, and/or other performance or configuration information associated with the nodes or segments.

Display area 805 may also show visual indicators, identifying a particular network node for which further information is shown in display area 810, and a performance attribute, associated with the node, for which a graph is shown in display area 815. For example, a particular row, in display area 805, may be shaded. As shown, for instance, the row associated with a router having the identifier "Router_B" may be shaded, to indicate that information regarding this router is displayed in display area 810. As also shown, the "Frame loss" performance attribute for this router may be shaded differently, and a thicker border may be displayed, to indicate that the graph shown in display area 815 pertains to this performance attribute.

Display area 810 may display detailed information for the particular selected network node or segment (i.e., the router having the identifier "Router_B," in this example). The detailed information may include, for example, information regarding a detected event. For example, as shown, a "Router down" event may have been detected for this router, and a recommendation may be presented in display area 810. Display area 815 may display a graph of the measured frame loss, over a particular period of time, associated with the selected router.

Selectable option 820 may allow a user to generate a rule object for a current set of performance and/or configuration attributes associated with a particular network node. For example, if the user selects the row corresponding to Segment ID "Segment_B," and selects selectable option 820, a rule object with the rule "Availability=99.07% AND Frame loss=1.19% AND Op State=UP AND Leased=YES" may be created. The user may then modify the rule object (e.g., provide a name and/or a recommendation, and modify the rule set associated with the rule object. This feature may be useful in situations where a user identifies an event for which a rule object is not presently available.

Figure 9:
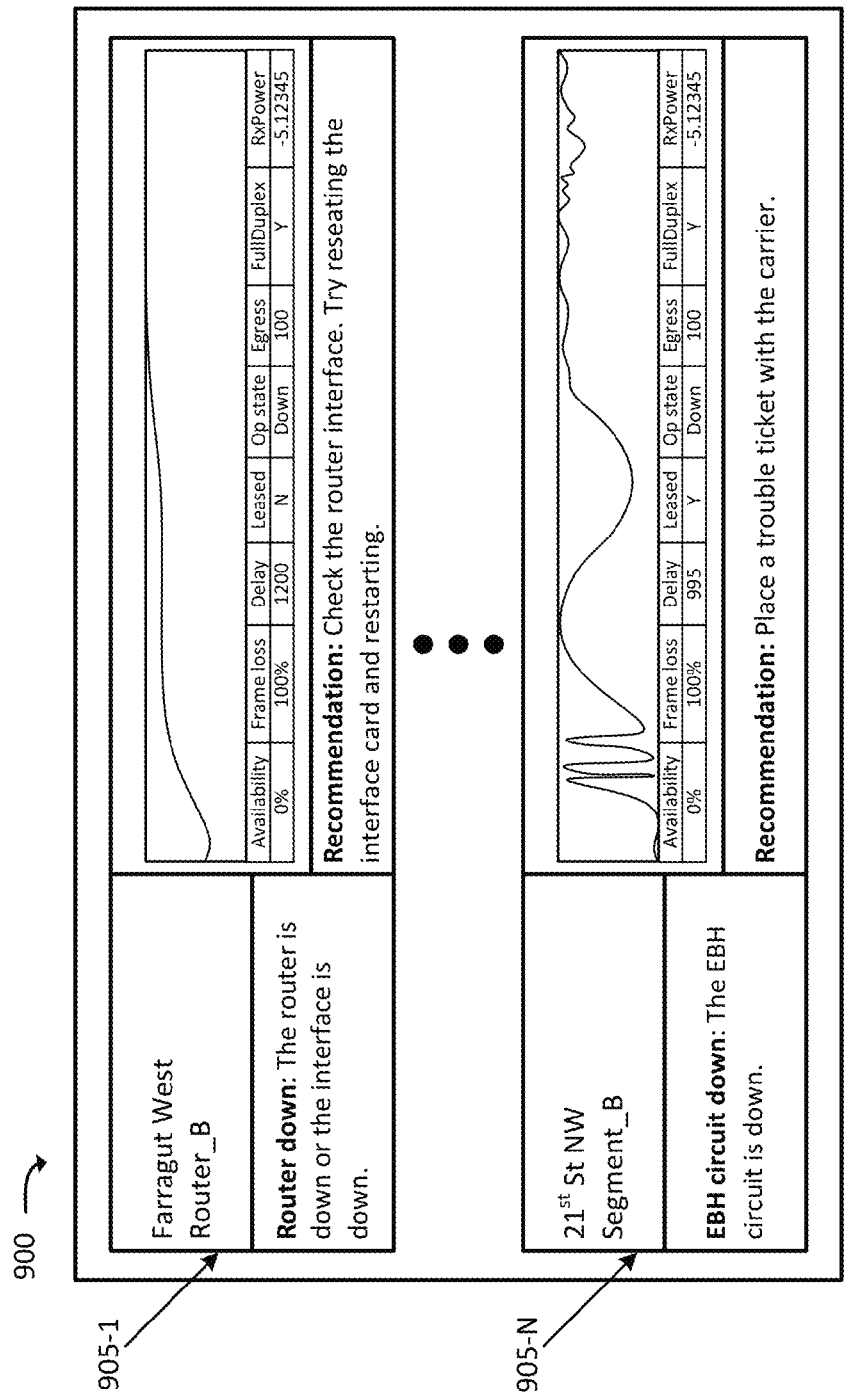
FIG. 9 illustrates an example report regarding detected events.

Selectable option 825 (e.g., a button) may allow a user to generate a report, based on the current performance attributes shown in display area 805 (and/or performance attributes received from network performance information server 260, but not shown in display area 805). FIG. 9 illustrates an example report 900, which may be generated based on a selection of selectable option 820. In some implementations, report 900 may include information regarding detected events regarding a selected set of network nodes or segments, and/or all network nodes and/or segments for which events have been detected. Report 900 may include a set of display areas 905-1 through 905-N (sometimes referred to herein individually as "display area 905," or collectively as "display areas 905," and where N is an integer greater than or equal to 1). In some implementations, each display area 905 may correspond to a particular detected event, while in some implementations, each display area 905 may correspond to a particular network node or segment.

As shown, display area 905-1 may correspond to a "Router down" event for a particular router, and may include information identifying the event, the router, and a recommendation for remedying the identified event. Display area 905 may also include network performance and/or configuration information, as well as a graph of a particular network performance attribute. In some implementations, a user may be able to select which network performance attribute or attributes are represented via a graph in display area 905.

Figure 10:
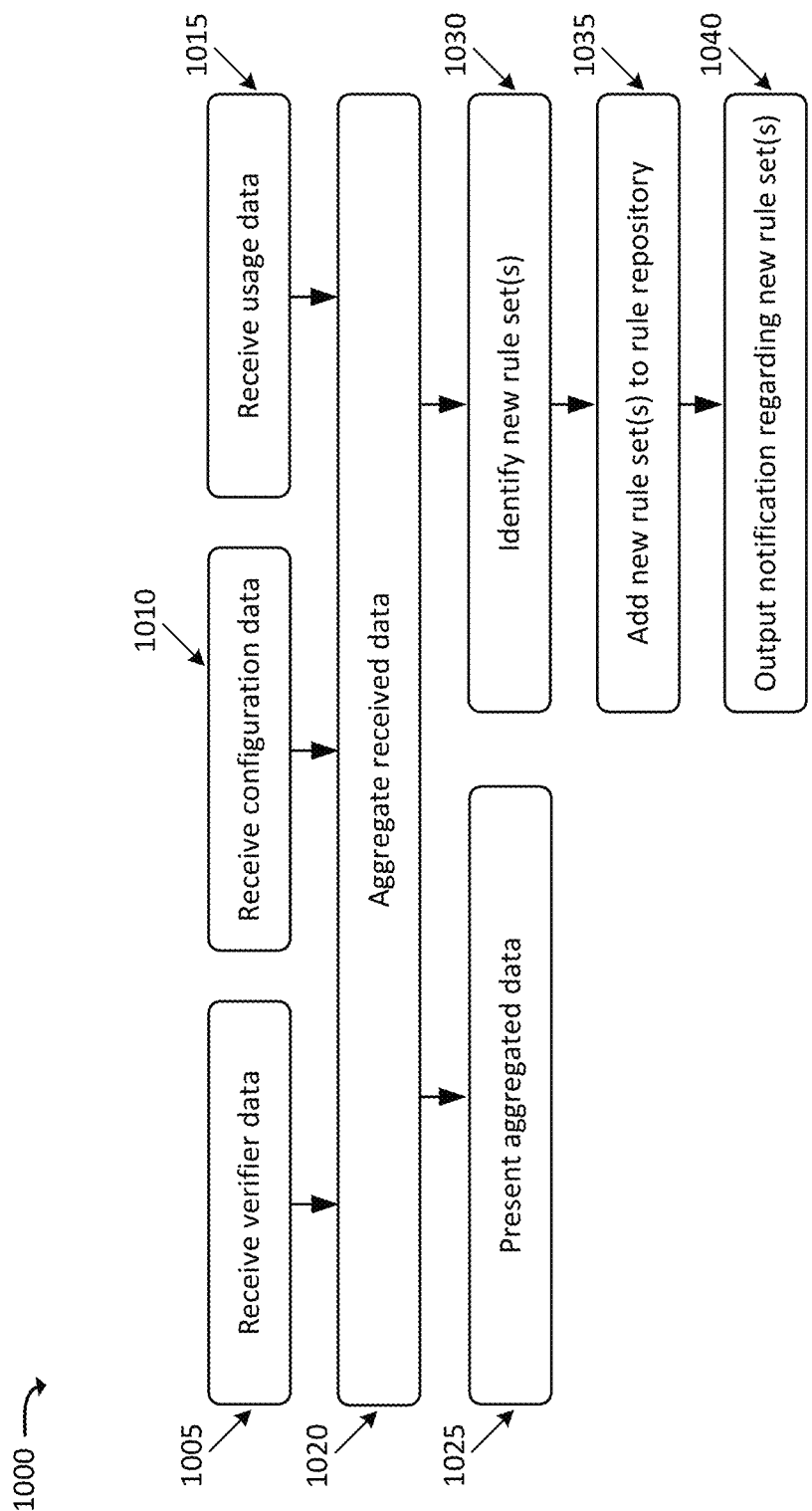
FIG. 10 illustrates an example process for presenting and/or otherwise processing network diagnostic information.

FIG. 10 illustrates an example process 1000 for presenting and/or otherwise processing network diagnostic information. In one example implementation, process 1000 may be performed by analysis server 265 (e.g., by analysis engine 410). In other implementations, some or all of process 1000 may be performed by one or more other devices in addition to, or in lieu of, analysis server 265.

Process 1000 may include receiving verifier data (block 1005). For example, analysis server 265 may receive verifier data from network performance information server 260 (e.g., from verifier information module 305). As mentioned above, the verifier data may include data generated by verifier 255, based on sending packets to various network components and responses received based on the packets.

Process 1000 may also include receiving configuration data (block 1010). For example, analysis server 265 may receive configuration data from network performance information server 260 (e.g., from router configuration module 310). As mentioned above, the configuration data may include data regarding information specifying how network nodes and/or segments should be configured.

Process 1000 may further include receiving usage data (block 1015). For example, analysis server 265 may receive usage data from network performance information server 260 (e.g., from router usage module 315). As mentioned above, the usage data may include data from network nodes and/or other sources, regarding actual performance attributes associated with network nodes and/or segments.

Process 1000 may additionally include aggregating the received data (block 1020). For example, analysis server 265 may store the received information in a data structure in a manner that organizes the data in a usable form. For example, analysis server 265 may store a set of records that include verifier data, configuration data, and usage data, pertaining to a particular network node or segment.

Figure 11:
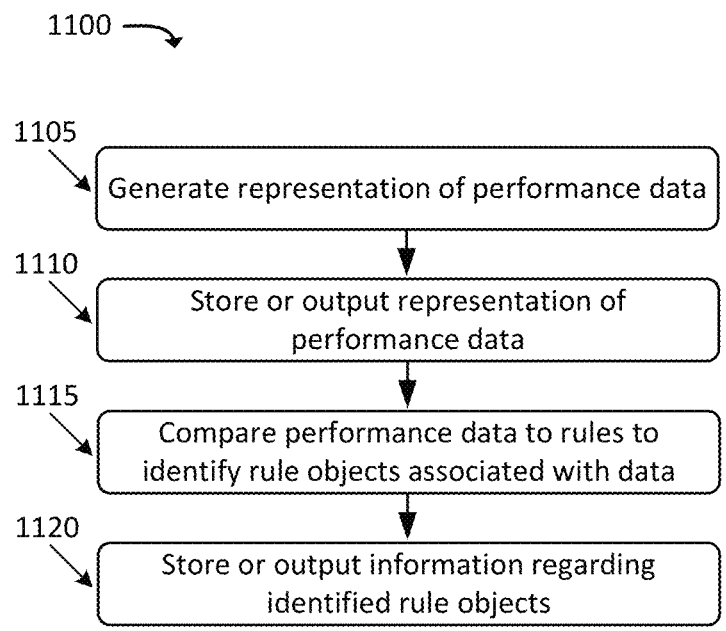
FIG. 11 illustrates an example process for presenting information regarding detected events.

Process 1000 may also include presenting the aggregated data (block 1025). For example, analysis server 265 (e.g., presentation module 420) may present the aggregated data via a user interface similar to user interfaces 800, 900, and/or another user interface. FIG. 11, below, illustrates example aspects of block 1025 in greater detail.

Process 1000 may further include identifying one or more new rule sets based on the aggregated data (block 1030). For example, as described above with respect to adaptive rule engine 415, analysis server 265 may identify new rule sets, that are not presently associated with any rule objects. The new rule sets may correspond to, for example, sets of network performance attributes that commonly occur, but are not presently associated with any rule objects. In some implementations, analysis server 265 may identify a new rule set based on a request from a user, such as based on a selection of selectable option 820 in FIG. 8.

Process 1000 may additionally include adding the new rule set(s) to the rule repository (block 1035). For example, analysis server 265 may generate a new rule object, based on the one or more new rule sets, to rule repository 405. Process 1000 may also include outputting a notification regarding the new rule set(s) (block 1040). For instance, analysis server 265 may alert a user that a new rule object has been created. The user may be provided with the opportunity to modify the new rule object.

FIG. 11 illustrates an example process 1100 for presenting information regarding detected events. As mentioned above, process 1100 may correspond to block 1025 of FIG. 10. In some implementations, process 1100 may be performed by analysis server 265 (e.g., by analysis engine 410 and presentation module 420). In other implementations, some or all of process 1100 may be performed by one or more other devices in addition to, or in lieu of, analysis server 265.

Process 1100 may include generating a representation of performance data (block 1105). For example, analysis server 265 may generate a user interface, such as user interface 800 and/or another user interface, based on performance data (e.g., as received from network performance information server 260).

Process 1100 may also include storing our outputting the representation of the performance data (block 1110). For example, analysis server 265 may output the user interface to analysis terminal 270.

Process 1100 may further include comparing the performance data to rules, to identify rule objects associated with the performance data (block 1115). For example, as described above, analysis server 265 may compare performance attributes, specified in the performance data, to conditions specified by sets of rules associated with rule objects. In some implementations, as mentioned above, comparing the performance attributes to the rules may include performing a pattern matching analysis (e.g., using LVQ) to determine whether the performance attributes match a reference set of performance attributes.

Process 1100 may additionally include storing or outputting the information regarding the identified rule objects (block 1120). For example, portions of user interface 800 may correspond to identified rule objects (e.g., display area 810 of FIG. 8). As another example, analysis server 265 may output user interface 900, and/or another user interface that includes information regarding identified rule objects.

Figure 12:
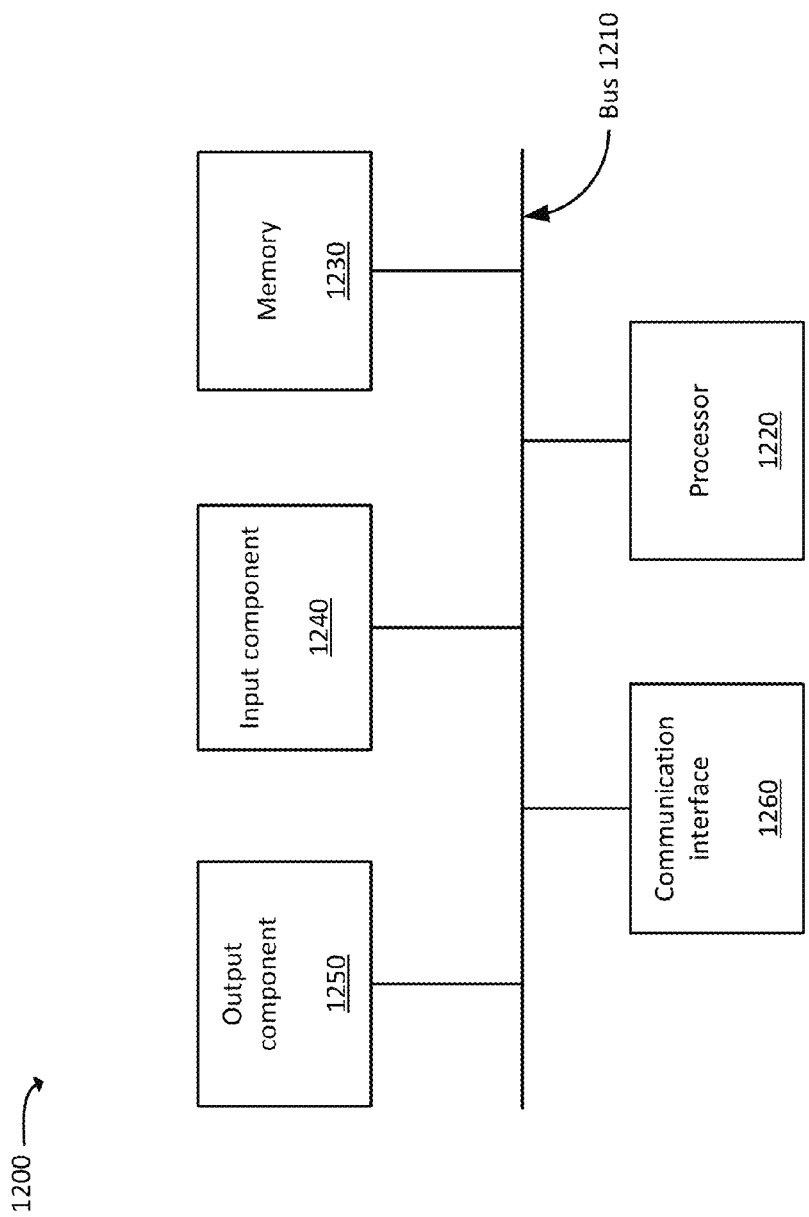
FIG. 12 illustrates example components of one or more devices, according to one or more implementations described herein.

FIG. 12 is a diagram of example components of device 1200. One or more of the devices illustrated in FIGS. 1-4 may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 10, the order of the blocks may be modified in other implementations. Further, non-dependent blocks may be performed in parallel.

Additionally, while an example data structure is illustrated in FIG. 5 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, performance information regarding a set of network devices;
   comparing, by the server device, the performance information to a set of rule objects, each rule object including:
      an identification of a network event,
      a set of conditions, and
      a recommendation regarding the network event;
   detecting, based on the comparing and by the server device, an occurrence of a particular network event, the detecting including:
      determining that the performance information, associated with a particular network device, of the set of network devices, meets the set of conditions associated with a particular rule object with which the particular network event is associated; and
   presenting, by the server device, information regarding the particular rule object, the presenting including:
      presenting information regarding the particular network event, and
      presenting information regarding a recommendation regarding the particular network event.

2. The method of claim 1, wherein the performance information includes at least one of:
   verifier information regarding at least one network device, of the set of network devices, that is based on responses to packets sent to the at least one network device, or
   usage information measured by at least one network device of the set of network devices.

3. The method of claim 1, further comprising:
   receiving configuration information regarding the particular network device;
   wherein the set of conditions includes a condition regarding the configuration information.

4. The method of claim 1, wherein determining that the performance information meets the set of conditions associated with the particular rule object includes:
   performing a pattern matching analysis between the performance information and a reference set of information.

5. The method of claim 4, wherein performing the pattern matching analysis includes performing a learned vector quantization ("LVQ") analysis.

6. The method of claim 1, further comprising:
   presenting at least some of the performance information in conjunction with presenting the information regarding the particular rule object.

7. The method of claim 6, wherein presenting at least some of the performance information includes:
   presenting performance information regarding the particular network device; and
   presenting performance information regarding at least one other network device.

8. The method of claim 1, further comprising:
   identifying a set of attributes, associated with the performance information, wherein the set of attributes is not associated with a rule object, of the set of rule objects; and
   generating a new rule object based on determining that the set of attributes is not associated with a rule object, wherein the new rule object includes a set of rules that are based on the set of attributes.

9. A system, comprising:
a memory device storing a set of processor-executable instructions; and
a processor configured to execute the processor-executable instructions, wherein executing the computer-executable instructions causes the processor to:
receive performance information regarding a set of network devices;
compare the performance information to a set of rule objects, each rule object including:
an identification of a network event,
a set of conditions, and
a recommendation regarding the network event, the recommendation including instructions on how to remedy the network event;
detect, based on the comparing, an occurrence of a particular network event, the detecting including:
determining that the performance information, associated with a particular network device, of the set of network devices, meets the set of conditions associated with a particular rule object with which the particular network event is associated; and
present information regarding the particular rule object, the information regarding the particular rule object including:
information regarding the particular network event, and
information regarding a recommendation regarding the particular network event, including instructions on how to remedy the network event.

10. The system of claim 9, wherein executing the processor-executable instructions, to determine that the performance information meets the set of conditions associated with the particular rule object, further causes the processor to:
perform a pattern matching analysis between the performance information and a reference set of information.

11. The system of claim 10, wherein performing the pattern matching analysis includes performing a learned vector quantization ("LVQ") analysis.

12. The system of claim 9, wherein executing the processor-executable instructions further causes the processor to:
present at least some of the performance information in conjunction with presenting the information regarding the particular rule object.

13. The system of claim 12, wherein executing the processor-executable instructions, to present at least some of the performance information, further causes the processor to:
present performance information regarding the particular network device; and
present performance information regarding at least one other network device.

14. The system of claim 9, wherein executing the processor-executable instructions further causes the processor to:

identify a set of attributes, associated with the performance information, wherein the set of attributes is not associated with a rule object, of the set of rule objects; and
generate a new rule object based on determining that the set of attributes is not associated with a rule object, wherein the new rule object includes a set of rules that are based on the set of attributes.

15. A method, comprising:
receiving, by a server device, performance information regarding a set of network devices;
receiving, by the server device, a set of rule objects, the rule objects including a set of conditions associated with a set of performance attributes;
determining, by the server device, a set of commonly occurring performance attributes, associated with the performance information, wherein none of the conditions associated with the rule objects, of the set of rule objects, are associated with the set of commonly occurring performance attributes; and
generating, by the server device, a new rule object that includes a set of conditions associated with the set of commonly occurring performance attributes.

16. The method of claim 15, wherein the rule objects, of the set of rule objects, each include:
an identification of an event, and
a recommendation regarding the event,
wherein the set of conditions, when true, indicate an occurrence of the event.

17. The method of claim 15, wherein the set of performance information includes at least one of:
verifier information that is based on sending packets to at least one network device of the set of network devices, or
usage information measured by at least one network device of the set of network devices.

18. The method of claim 15, further comprising:
outputting a notification that the new rule object has been created.

19. The method of claim 15, wherein the new rule object includes:
a set of conditions, which, when true, indicate an occurrence of an event, the set of conditions being based on the commonly occurring performance attributes.

20. The method of claim 19, wherein the performance information is first performance information, wherein the set of network devices is a first set of network devices,
the method further comprising:
receiving second performance information regarding a second set of network devices;
determining, based on the second performance information, that the set of conditions, associated the event, is true;
determining, based on the set of conditions being true, that the event has occurred; and
outputting information indicating the occurrence of the event.

* * * * *